Sept. 3, 1929.   A. E. GRANT   1,726,663
MEANS FOR AUTOMATICALLY LUBRICATING SHAFT BEARINGS
Filed May 24, 1927
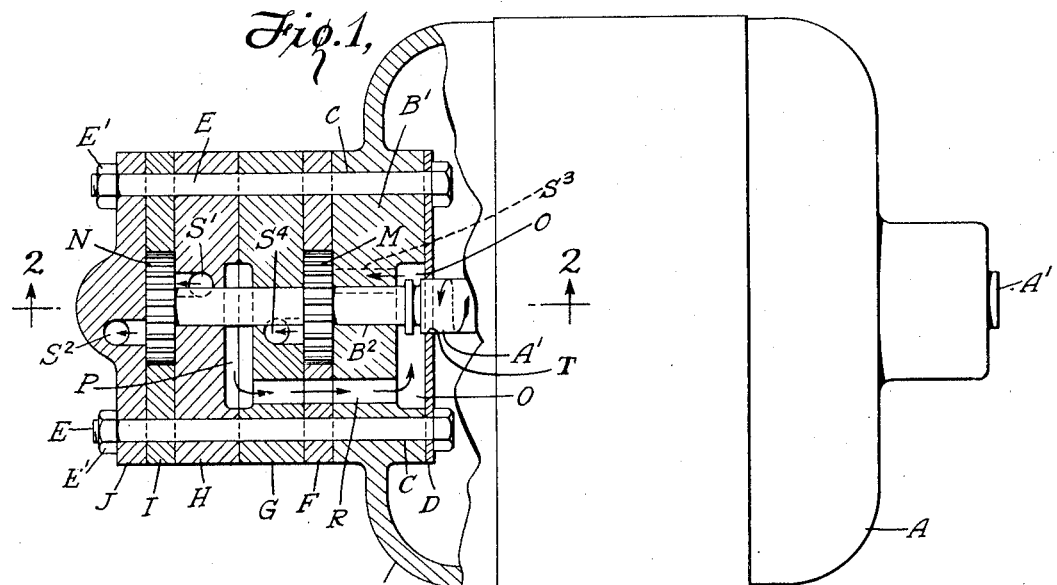
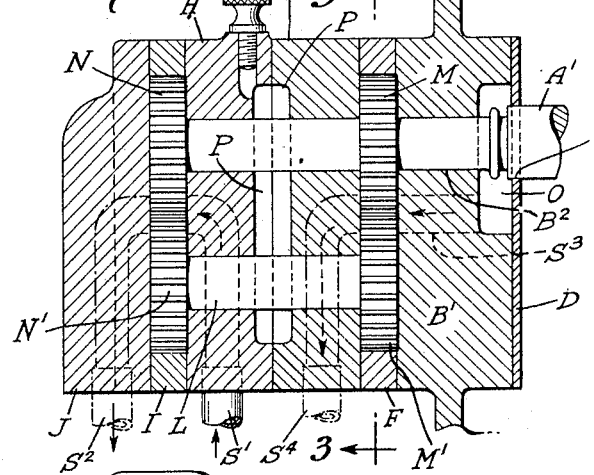
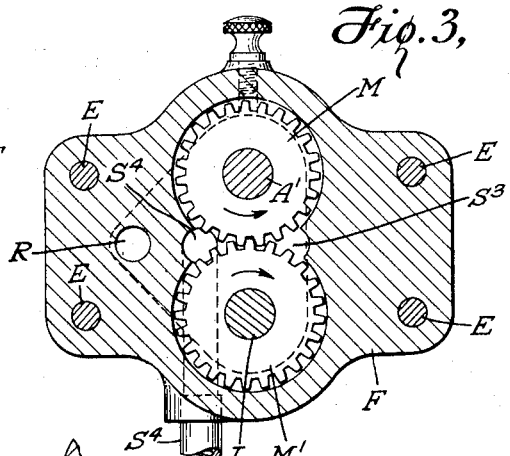
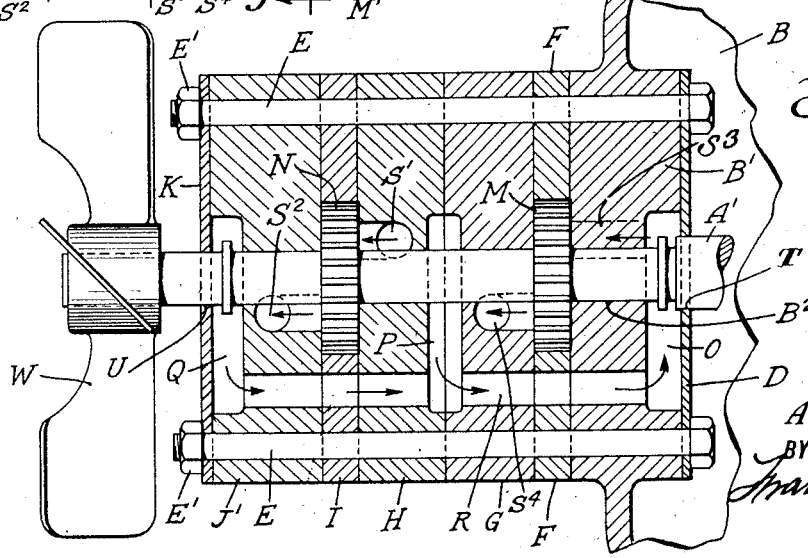
INVENTOR
Albert E. Grant
BY
ATTORNEY Patented Sept. 3, 1929.

1,726,663

UNITED STATES PATENT OFFICE.

ALBERT E. GRANT, OF NEW YORK, N. Y., ASSIGNOR, BY MESNE ASSIGNMENTS, TO WESTINGHOUSE ELECTRIC & MANUFACTURING COMPANY, A CORPORATION OF PENNSYLVANIA.

MEANS FOR AUTOMATICALLY LUBRICATING SHAFT BEARINGS.

Application filed May 24, 1927. Serial No. 193,766.

My invention relates to means for automatically lubricating shaft bearings for machinery.

The object of my invention is to provide means for continuously and automatically supplying oil to the bearings of the machine and prevent any oil from escaping to the exterior of the casing through the journals or bearings.

A further object is to provide a motor and mechanism embodying the invention, which may be used to pump oil and to drive a fan or other machine.

Referring to the drawings which form a part of this specification—

Figure 1 is a plan view of an electric motor and pumps for oil in which my invention is embodied, the pumps and bearings being disclosed in section on the line through the axis of the main shaft of the motor.

Figure 2 is a vertical sectional view through the pump and gear bearings.

Figure 3 is a cross sectional view taken on line 3—3 of Figure 2.

Figure 4 is a plan sectional view of a construction illustrating the device as used in driving a fan. A, indicates an electric motor having the usual shaft $A^1$, which in this construction is extended to serve as the driver for the pumps and fan. B, indicates a cap portion of the motor casing, the casing parts being joined in separable relation on the vertical line $A^2$. The cap B, is provided with an integral end wall portion $B^1$ having a central bore $B^2$ which serves as a bearing for the shaft $A^1$, and is also provided with holes C—C, etc., through which the bolts E—E etc., extend to hold the elements D—F—G—H—I—J and K, together and to the wall as shown; each of said elements having their contacting surfaces formed with plane surfaces which contact and form a fluid tight joint with each other, so that when the bolts C are held under tension by the nuts $E^1$, the assembled units will be clamped firmly together. Bearings $B^2$ are also formed in the elements G and H respectively and similar bearings are also formed in said elements for the jack-shaft L. Gear wheels M and N are firmly mounted on the shaft $A^1$ and similar gear wheels $M^1$ and $N^1$ are firmly mounted on the jack-shaft L and mesh with and are driven by the gears M and N, each set of gears comprising M—$M^1$ and N—$N^1$ serving as a gear pump. The pump N—$N^1$ draws oil from an outside source of supply through inlet $S^1$ and discharges through outlet $S^2$. The pump M—$M^1$ when rotated in the direction indicated by the arrows, draws oil supplied by the pump N—$N^1$ from said pump chamber, the oil flowing or escaping between the rotating elements and pump walls and between the bearings into the overflow chambers O—P and Q respectively, connected by means of conduit R and communicating with suction side of pump M—$M^1$ through conduit $S^3$. The oil so drawn through conduit $S^3$ is delivered through outlet $S^4$ and led either to the inlet conduit $S^1$ or to the source of supply. Due to the reduction in atmospheric pressure in the chambers O and Q, some air may pass from the outer atmosphere along the shaft at the points T—T respectively, as a perfectly air tight joint between the shaft and bearing surface of the cap-plates D and K is difficult to maintain without the use of stuffing boxes at these points, and one of the objects of my invention is to dispense with the use of stuffing boxes and still prevent oil from seeping or escaping from within the pump casing to the outer side thereof.

Therefore, in operating, the oil is drawn from the pump chambers of the pump N—$N^1$ and M—$M^1$ through the journals by the suction of the pump M—$M^1$ on one side and pressure of oil in pump chambers of N—$N^1$, the overflow chambers always having a lower pressure than the normal atmospheric pressure. The pump comprising the gears N and $N^1$ may thus be used for pumping oil under pressure to any point desired, while the pump comprising the gears M and $M^1$ acts to supply oil to the bearings continuously while preventing any excess oil from flowing to the exterior of the pump casing through the bearings. In Figure 4, the shaft $A^1$ extends beyond the pump casing and the fan W is mounted thereon. A pulley or other device may be substituted for the fan if desired, while the gears N—$N^1$ are used to pump oil for any purpose, as illustrated in Figure 2, the oil being pumped from the source of supply thru conduit $S^1$ and discharged thru conduit $S^2$ for use at any point.

It is believed that the above description and drawings clearly describe the invention, the novel features of which are set forth in the claims.

Having thus described my invention I claim as new:

1. A pump construction comprising a casing having bearings formed therein, a shaft supported in said bearings, a primary pump for oil and a vacuum pump driven by said shaft, one of which serves to pump oil for use and one of which serves to draw oil thru said bearings to continuously lubricate the same, the said oil being overflow fresh oil from the primary pump.

2. In combination, a casing having bearings formed therein, a shaft supported in said bearings, a primary pump and a vacuum pump driven by said shaft, said casing having chambers and conduits formed therein communicating with said bearings and with the inlet side of said vacuum pump, said vacuum pump serving to draw fresh oil thru said bearings into said chambers.

3. In combination, a casing having bearings formed therein, a shaft supported in said bearings, a primary pump and a vacuum pump comprising a jack-shaft, and gears mounted on said shaft and jack-shaft, said casing having conduits formed therein communicating with said bearings and with the inlet side of said vacuum pump, said vacuum pump serving to draw fresh oil thru said bearings into said chambers.

4. The combination with an electric motor having a casing, of a separable cap portion having an integral end wall provided with a bearing and having its outer side formed with a plane surface which serves as a side wall for a pair of gears which serve as a pump, said motor comprising a shaft which extends thru said cap portion and rests in said bearing and drives said pump, casing elements comprising separable sections each having plane surfaces and means for holding said sections in abutting relation, to form a separable pump casing of the character shown.

5. The combination with a motor having a casing, of a separable cap portion having an end wall formed with a plane surface to serve as a side wall for a gear pump, a pump casing comprising a plurality of separable sections each having plane surfaces, means for holding said sections in abutting relation, said motor having a shaft extending thru said sections, a jack-shaft supported in bearings formed in said pump casing, gear wheels on said shaft which serve as pump elements, a shaft driven by said motor resting in bearings formed in said sections, gears on said shaft meshing with the gears on said jack-shaft, said sections having chambers formed therein thru which said motor driven shaft extends and having conduits communicating with said chambers, one of said pumps acting to pump oil for use and one acting to draw oil from said chambers and maintain a reduced atmospheric pressure therein.

In testimony whereof I have affixed my signature.

ALBERT E. GRANT.